(12) United States Patent
Shimizu

(10) Patent No.: US 6,588,908 B2
(45) Date of Patent: Jul. 8, 2003

(54) PROJECTOR DEVICE

(75) Inventor: Hitoshi Shimizu, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/156,190

(22) Filed: May 29, 2002

(65) Prior Publication Data

US 2002/0180934 A1 Dec. 5, 2002

(30) Foreign Application Priority Data

May 30, 2001 (JP) ......................................... 2001-162096

(51) Int. Cl.$^7$ ............................................. G03B 21/28
(52) U.S. Cl. ........................................ 353/81; 348/771
(58) Field of Search ........................... 353/81, 84, 33; 348/771, 743, 742

(56) References Cited

U.S. PATENT DOCUMENTS

| | | | |
|---|---|---|---|
| 6,454,417 B1 | * | 9/2002 | Takamoto et al. ............ 353/33 |
| 6,461,000 B1 | * | 10/2002 | Magarill ....................... 353/81 |
| 6,471,356 B1 | * | 10/2002 | Gohman et al. .............. 353/33 |
| 6,505,939 B1 | * | 1/2003 | Bierhuizen et al. ........... 353/94 |

* cited by examiner

Primary Examiner—William Dowling
(74) Attorney, Agent, or Firm—Harness, Dickey & Pierce, P.L.C.

(57) ABSTRACT

The projector device can be reduced in thickness by using a total internal reflection (TIR) prism wherein the angle formed between a line of projection of the normal vector of the total reflection plane on the surface of a digital micromirror device (DMD) and the long or short side of the DMD is set to be smaller than 45°. The TIR prism has a total reflection plane for totally reflecting illuminating light brought to incidence by an illuminating optical system to guide it to the DMD and totally transmit light optically modulated by the DMD to guide it to a projecting optical system, and this total reflection plane is so arranged relative to the DMD that the angle formed between a line of projection of its normal vector on the surface of the DMD and the long side of the DMD form an angle smaller than 45°. An incidence plane on which the illuminating light is brought to incidence by the illuminating optical system is so formed that the illuminating light brought to incidence vertically on its incidence plane, when totally reflected by the total reflection plane and emitted from an emission plane toward the DMD, be emitted at an incidence angle of 24° to the surface of the DMD in a direction at an angle of 45° to the long side of the DMD.

2 Claims, 8 Drawing Sheets

PROJECTOR DEVICE

BACKGROUND OF THE INVENTION

1. Field of the Invention

The present invention relates to a projector device, and more particularly to a projector device for projecting images on a screen by using a digital micromirror device (DMD).

2. Description of the Related Art

A DMD is configured of a large number of micromirrors arranged in a matrix, in which each micromirror constitutes one pixel of a displayed image. Each micromirror takes one of two inclined states, an ON state and an OFF state. In the ON state, illuminating light is reflected into a projecting optical system, while in the OFF state it is projected away from the projecting optical system. Therefore, in a projector device using a DMD, the projecting optical system projects only the light reflected by micromirrors in the ON state, resulting in the formation of a displayed image composed of a pattern of different levels of brightness on the screen.

Figure 5:
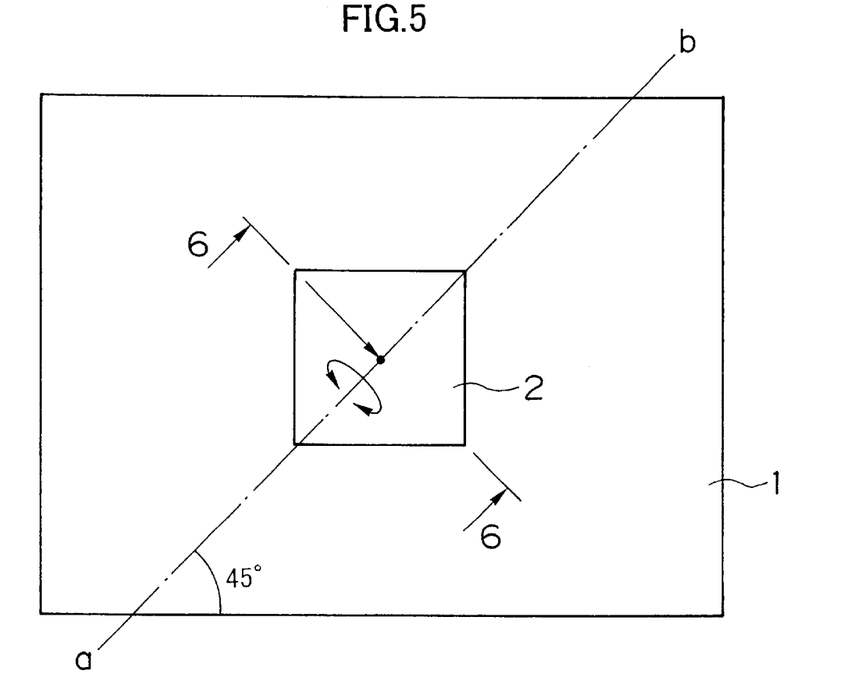
FIG. 5 shows a plan of a micromirror drive structure in a DMD.
Figure 6:
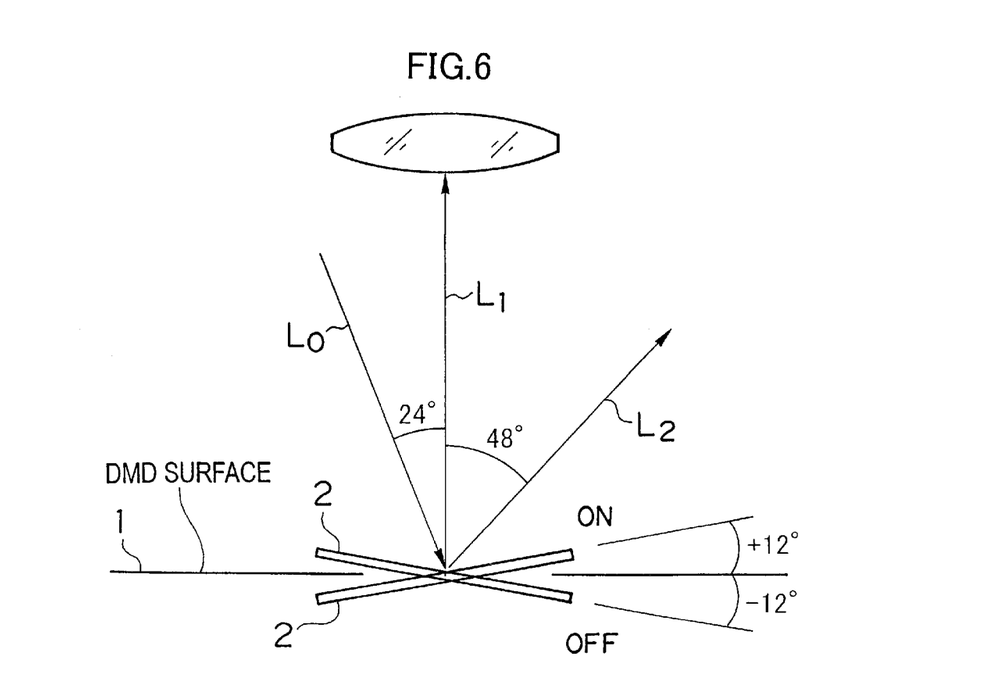
FIG. 6 shows the 6—6 section in FIG. 5.

FIG. 5 shows a plan of a micromirror drive structure in a DMD, and FIG. 6 shows the 6—6 section in FIG. 5. The drawings show expanded views of one extracted out of many micromirrors constituting the DMD, which actually is configured of a large number of micromirrors arranged in a matrix.

As illustrated in FIG. 5, a micromirror 2 of a DMD 1 can take either an ON state inclined by +12° or an OFF state inclined by −12° to the DMD surface by turning around a rotation axis ab. This rotation axis ab of the micromirror 2 is set in a direction inclined by 45° to the long (or short) side of the DMD, and illuminating light $L_o$ irradiates the surface of the DMD at an incidence angle of 24° in a direction orthogonal to this rotation axis ab. The illuminating light $L_o$ irradiating the DMD, if reflected by the micromirror 2 in the ON state, turns into projecting light $L_1$ whose angle of reflection by the DMD surface is 0° or, if reflected by the micromirror 2 in the OFF state, turns into projecting light $L_2$ whose angle of reflection by the DMD surface is −48°. Only the projecting light $L_1$, which is a luminous flux reflected by the micromirror 2 in the ON state at 0° in the angle of reflection, comes incident on the projecting optical system, and a displayed image composed of a pattern of different levels of brightness is formed on the screen. Known projector devices using such a DMD include ones disclosed in Japanese Patent Application Publication Nos. 9-98442 and 12-206452.

Incidentally, for a projector device using a DMD as stated above, on account of the above-described structure of the DMD 1, the illuminating optical system has to be configured to meet two constraints that the illuminating light $L_o$ should be brought to incidence in a direction orthogonal to the rotation axis of the micromirror 2 (a direction inclined by 45° to the long or short side of the DMD 1) and the illuminating light $L_o$ should further be brought to incidence at an angle of 24° to the surface of the DMD 1.

Figure 7:
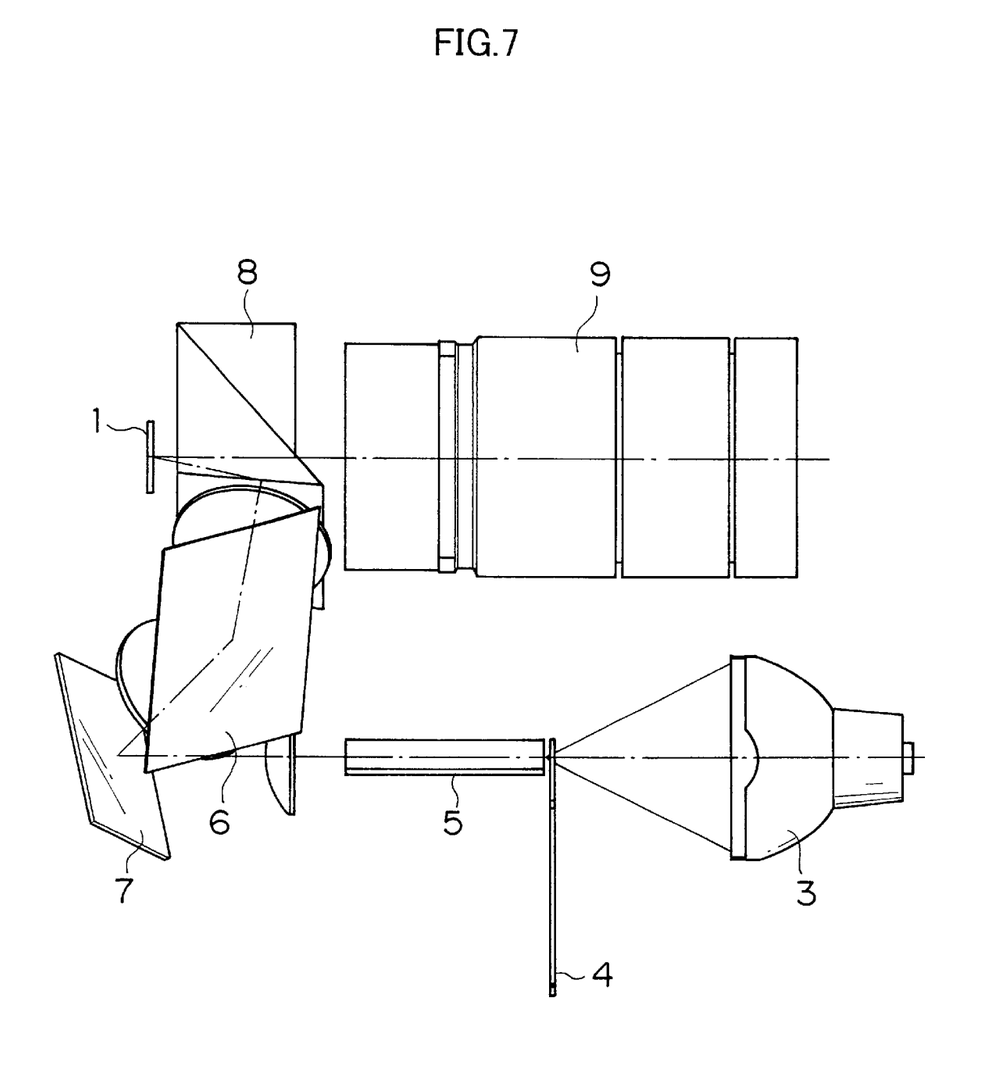
FIG. 7 shows a plan of a projector device, which is an embodiment of the prior art.
Figure 8:
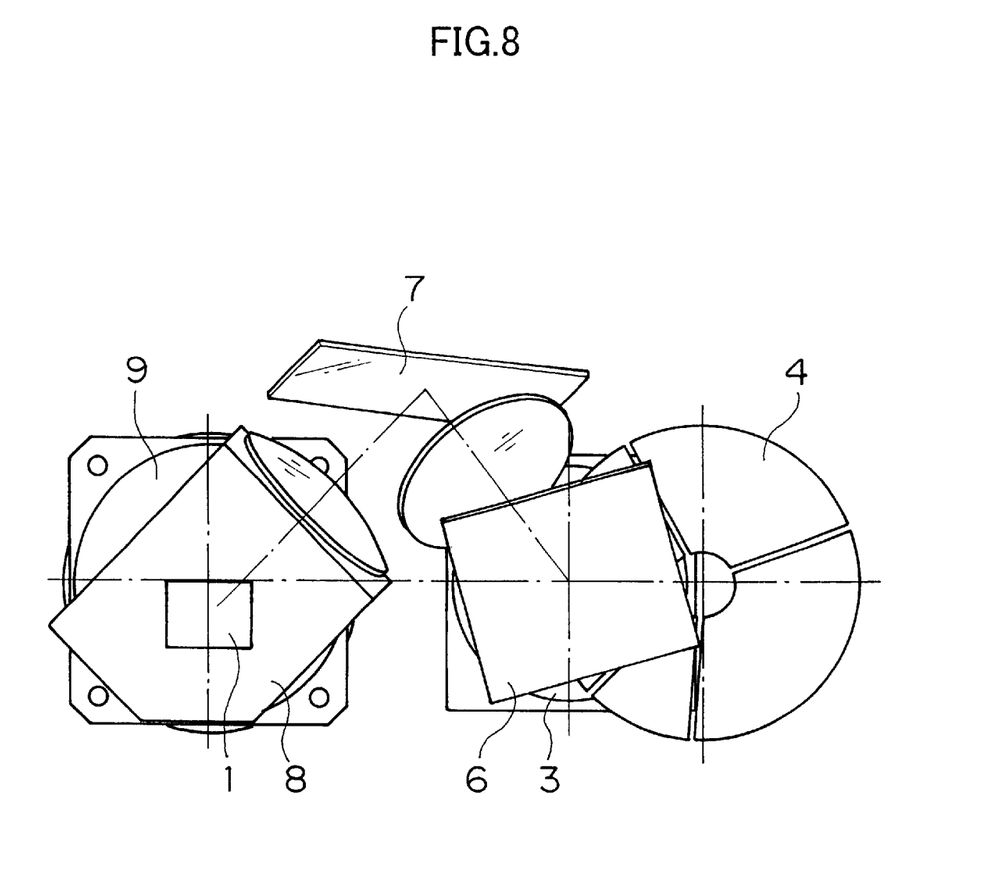
FIG. 8 shows a rear view of the projector device, which is the embodiment of the prior art.

For this reason, in a projector device according to the prior art, as shown in FIG. 7 and FIG. 8, a total internal reflection prism (TIR prism) is used to guide the illuminating light onto the DMD 1. Thus, light emitted from a light source 3 is condensed into a rod integrator 5 via a color wheel 4, guided by a first mirror 6 and a second mirror 7 to a TIR prism 8 and totally reflected by that TIR prism 8 thereby to irradiate the DMD 1 in a predetermined direction (a direction inclined by 45° to the long or short side of the DMD 1) and at a predetermined incidence angle (24°). By causing the illuminating light irradiating the DMD 1 in this way to be reflected by the DMD 1, optical modulation is performed, and the light transmitted by the TIR prism 8 after that optical modulation is projected by a projecting optical system 9 onto a screen.

Figure 9:
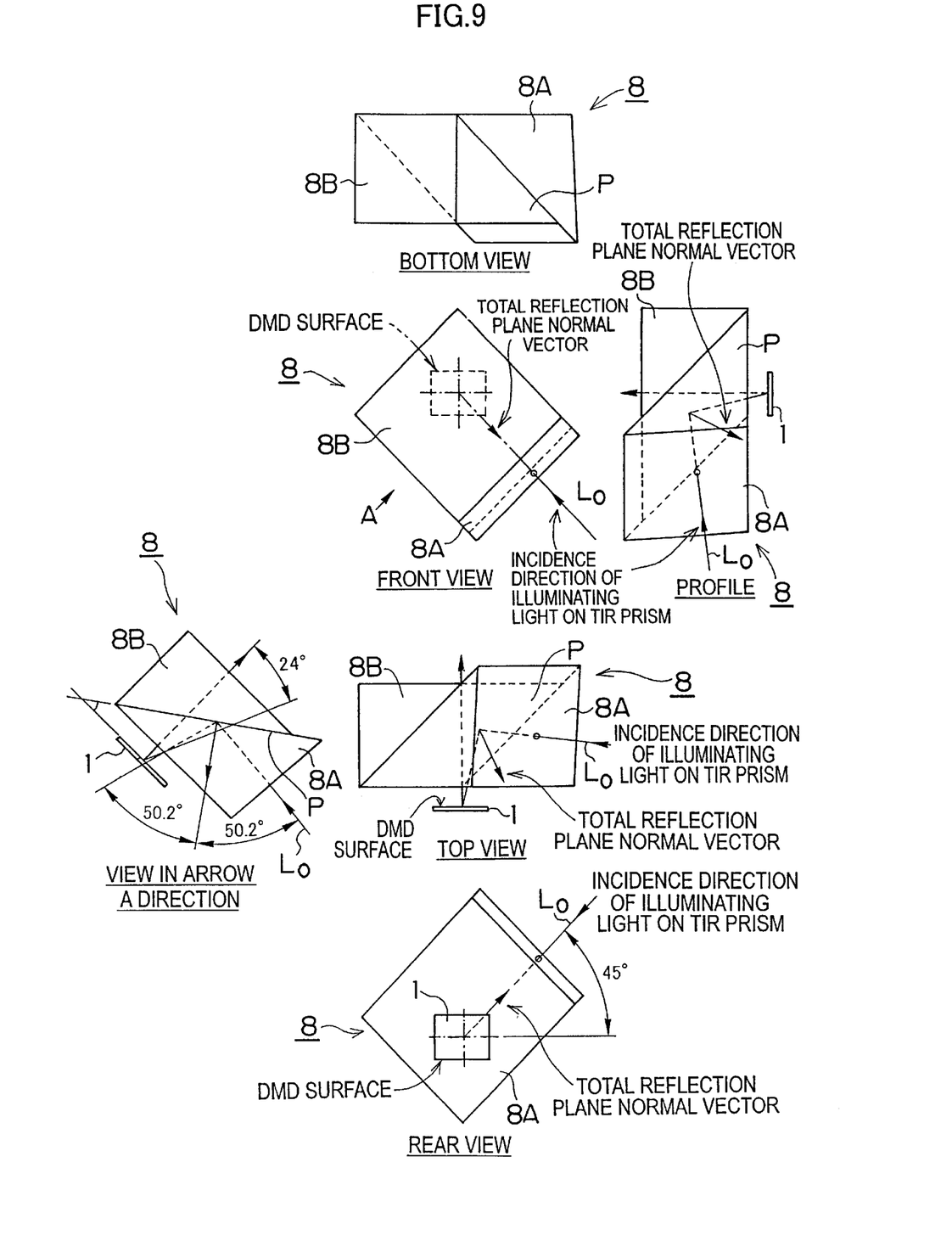
FIG. 9 is a development illustrating the configuration of a TIR prism according to the prior art.

This TIR prism 8, as shown in FIG. 9, is configured of a first prism 8A and a second prism 8B. By causing illuminating light guided in from an illuminating optical system to be totally reflected by the total reflection plane P of the first prism 8A, the DMD 1 is irradiated in the predetermined direction and the predetermined incidence angle, and the reflected light from the DMD 1 is guided to the projecting optical system 9 by causing it to be wholly transmitted by the total reflection plane P of the first prism 8A.

Now, in the conventional TIR prism 8, as illustrated in FIG. 9, the inclination angle $\alpha$ of the total reflection plane P is so set as to totally reflect the incident illuminating light and to totally transmit the reflected light from the DMD 1 and the direction of the total reflection plane P is such that the projection line representing its normal vector as viewed in the direction vertical to the surface of the DMD 1 forms an angle of 45° to the long side of the DMD 1 (in FIG. 9, the normal vector of the total reflection plane shown in the front view and the rear view corresponds to the projection line representing the normal vector of the total reflection plane as viewed in the direction vertical to the surface of the DMD 1). The illuminating light, as is the total reflection plane normal vector, is brought to incidence on this TIR prism 8 at a predetermined incidence angle (50.2° here) in a direction at 45° to the long side of the DMD 1, and caused to be reflected by the total reflection plane 4P to be guided to the DMD 1.

However, this projector device according to the prior art, since the illuminating light should be brought to incidence on the TIR prism 8 in a direction at 45° to the long side of the DMD 1 as shown in FIG. 8 and FIG. 9, involves the disadvantage of being increased in thickness.

SUMMARY OF THE INVENTION

An object of the present invention, attempted in view of this circumstance, is to provide a projector device that permits a reduction in thickness.

In order to achieve the object stated above, the present invention is directed to a projector device in which light from a light source is guided by an illuminating optical system to a total internal reflection prism, the light totally reflected by the total internal reflection prism is optically modulated by having the light reflected by a digital micromirror device, and the light transmitted by the total internal reflection prism after the optical modulation is projected by a projecting optical system on a screen, wherein: the total internal reflection prism has a total reflection plane which totally reflects illuminating light to guide the illuminating light to the digital micromirror device and totally transmits the light having undergone optical modulation by the digital micromirror device, and is so arranged relative to the digital micromirror device that a projection line representing a normal vector of the total reflection plane as viewed in a direction vertical to a surface of the digital micromirror device forms an angle smaller than 45° to one of a long side and a short side of the digital micromirror device; and the illuminating optical system so brings the illuminating light into incidence on the total reflection plane that a projection line representing the optical axis of the illuminating light emitted from the total internal reflection prism to the digital micromirror device, as viewed in the direction vertical to the surface of the digital micromirror device, forms an angle of 45° to the one of the long side and the short side of the digital micromirror device.

According to the invention, the TIR prism is so arranged relative to the DMD that a projection line representing the normal vector of the total reflection plane as viewed in a direction vertical to the surface of the DMD forms an angle smaller than 45° to the long or short side of the DMD. Relative to the total reflection plane so arranged, the illuminating optical system so brings the illuminating light into incidence that a projection line representing the optical axis of the illuminating light emitted from the TIR prism to the DMD, as viewed in a direction vertical to the surface of the DMD, forms an angle of 45° to the long or short side of the DMD. This dispenses with the need to bring the illuminating light into incidence on the TIR prism in a direction forming an angle of 45° to the long or short side of the DMD as according to the prior art, and thereby enables the projector device to be reduced in thickness.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A projector device, which is a preferred embodiment of the present invention, will be described in detail below with reference to accompanying drawings.

Figure 1:
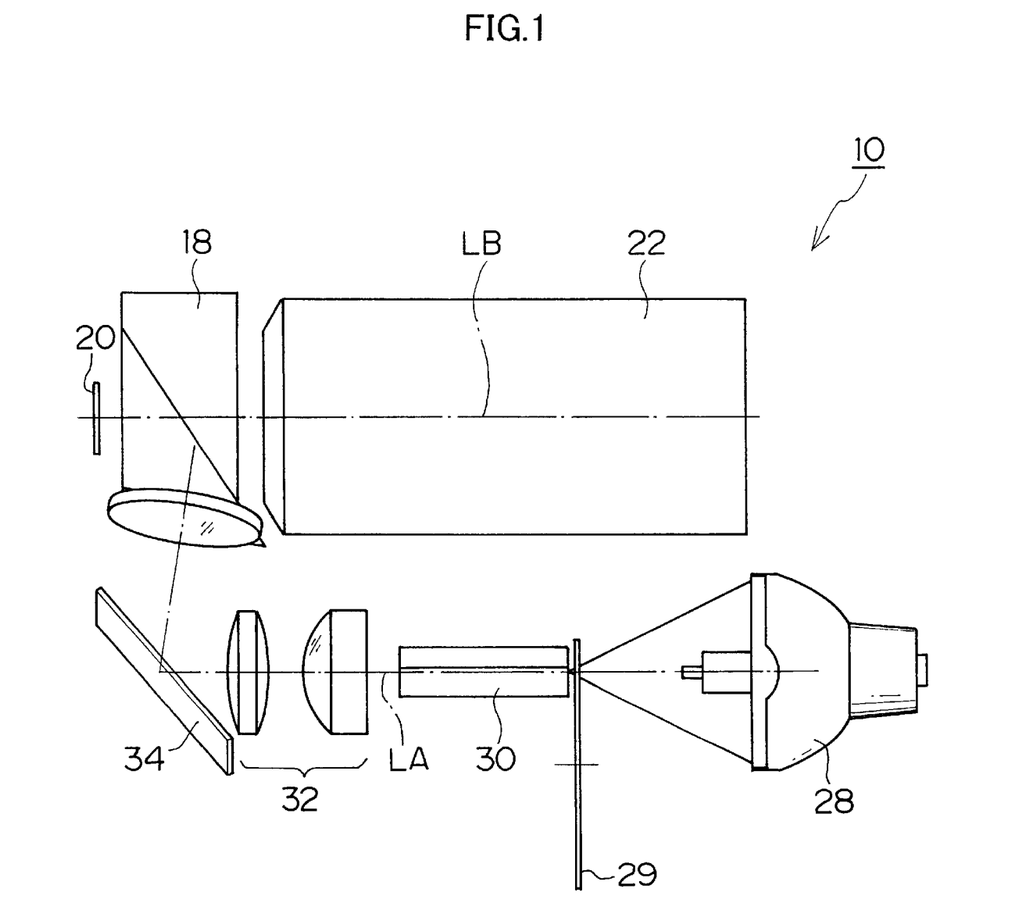
FIG. 1 shows a plan of a projector device, which is a preferred embodiment of the invention.
Figure 2:
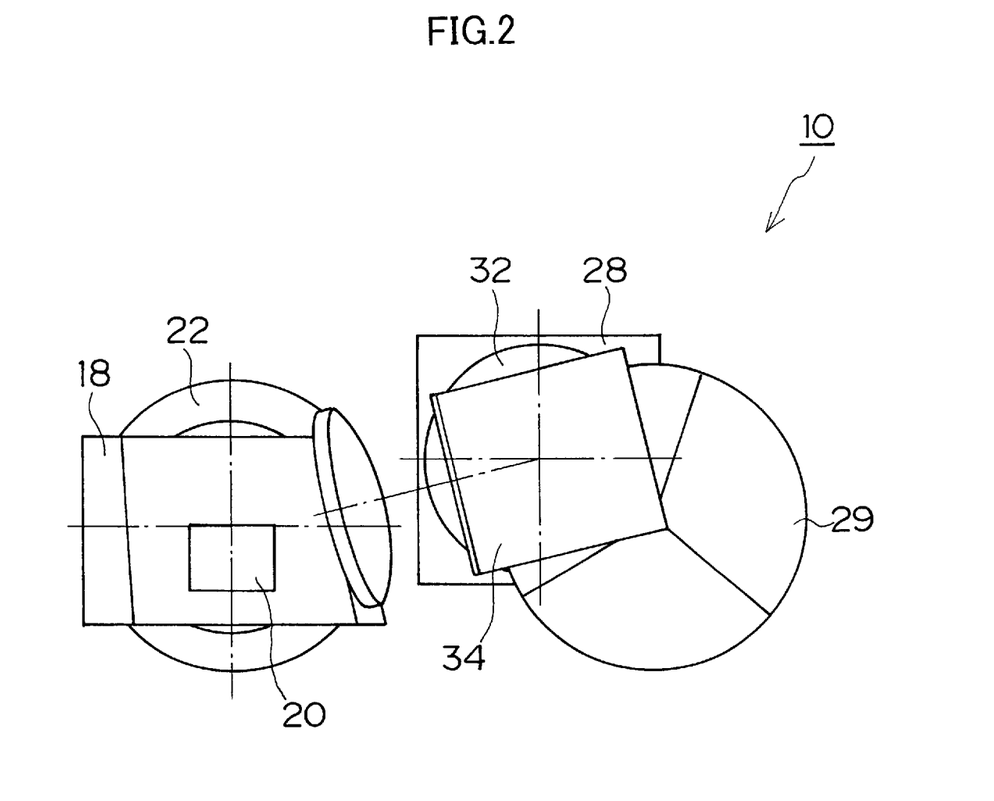
FIG. 2 shows a rear view of the projector device, which is the preferred embodiment of the invention.

FIG. 1 and FIG. 2 respectively show a plan and a rear view of a projector device, which is a preferred embodiment of the invention. As shown in these drawings, a projector device 10 in this mode of implementing the invention comprises an illuminating optical system 16, a TIR prism 18, a DMD 20 and an projecting optical system 22.

The illuminating optical system 16 comprises a light source 28, a color wheel 29, a rod integrator 30, relay lenses 32 and a reflecting mirror 34, all arranged on an optical axis LA (the optical axis of the illuminating optical system). Illuminating light emitted from the light source 28 is brought to incidence on the rod integrator 30 via the color wheel 29. Its brightness is uniformized by being reflected within the rod integrator 30 a plurality of times, and the uniformized illuminating light is emitted to the relay lenses 32. The relay lenses 32 condense the illuminating light emitted from the rod integrator 30, and this condensed illuminating light is brought to incidence on the TIR prism 18 by being reflected by the reflecting mirror 34.

The TIR prism 18 totally reflects the illuminating light guided from the light source 28 by the illuminating optical system to guide it to the DMD 20, and totally transmits light having undergone optical modulation by the DMD 20 and guides it to the projecting optical system 22. In this process, the TIR prism 18 totally reflects the illuminating light brought to incidence in a predetermined direction to irradiate the surface of the DMD 20 at an incidence angle of 24° in a direction forming an angle of 45° to the long side of the DMD 20. The configuration of this TIR prism 18 will be described in detail afterwards.

The DMD 20 comprises a large number of micromirrors arranged in a matrix. The illuminating light is optically modulated by subjecting each micromirror to ON/OFF control. This DMD 20 is installed vertically to an optical axis LB to keep its long side horizontal relative to the installation plane.

The projecting optical system 22, arranged on the optical axis LB, projects in an enlarged size projecting light transmitted by the TIR prism 18 after being optically modulated by the DMD 20. This projecting optical system 22 is provided with a focusing function for focusing the image to be projected.

In the projector device 10 configured as described above, when the light source 28 is turned on, the illuminating light emitted from that light source 28 is guided to the TIR prism 18 via the rod integrator 30, the relay lenses 32 and the reflecting mirror 34 and, after being totally reflected by the TIR prism 18, irradiates the surface of the DMD 20 in a predetermined direction at a predetermined angle of incidence. The DMD 20 reflects only the part of light required for a predetermined image to the projecting optical system 22, and that projecting light is enlarged by the projecting optical system 22 and projected on a screen (not shown).

Figure 3:
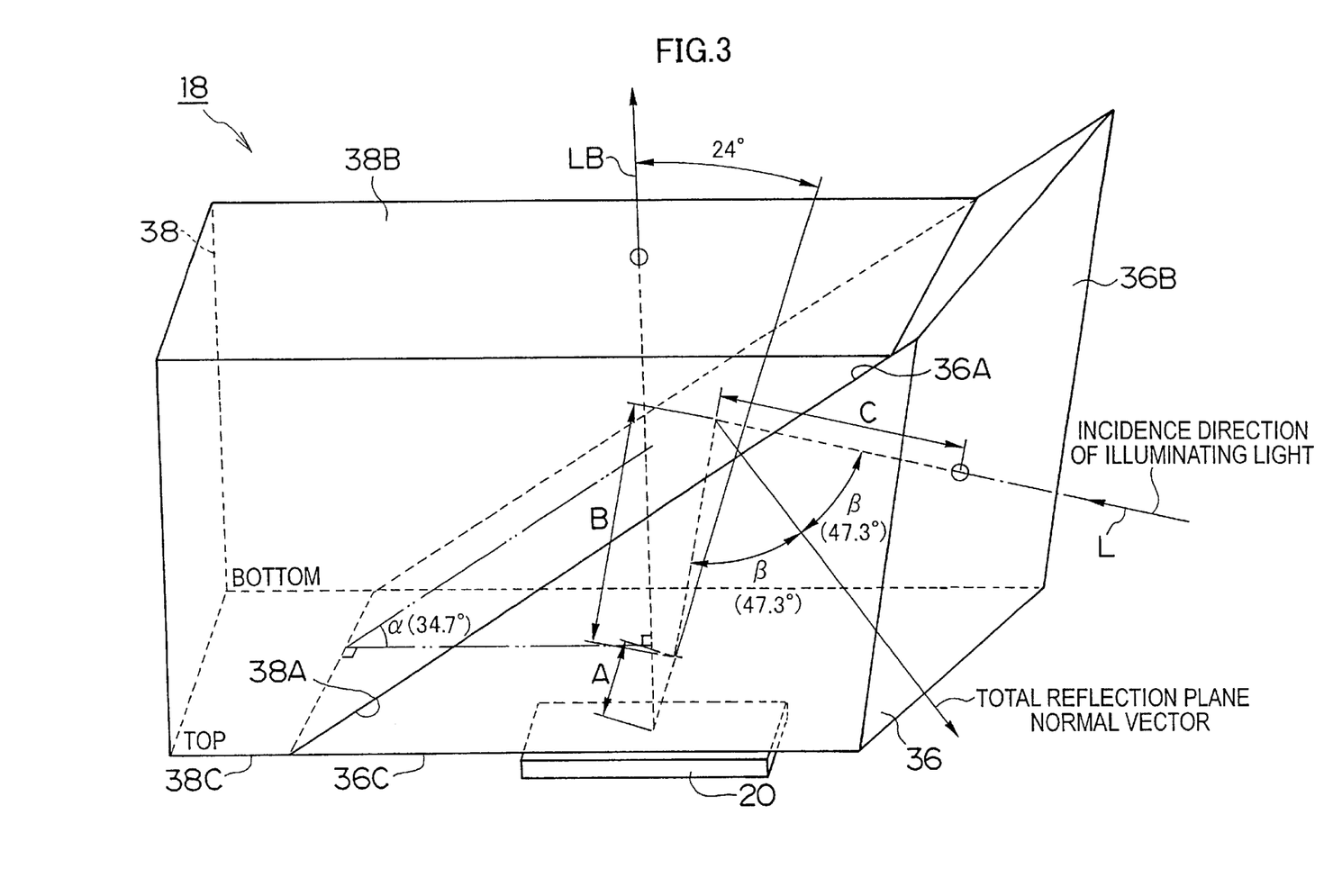
FIG. 3 shows a perspective view of the configuration of a TIR prism.
Figure 4:
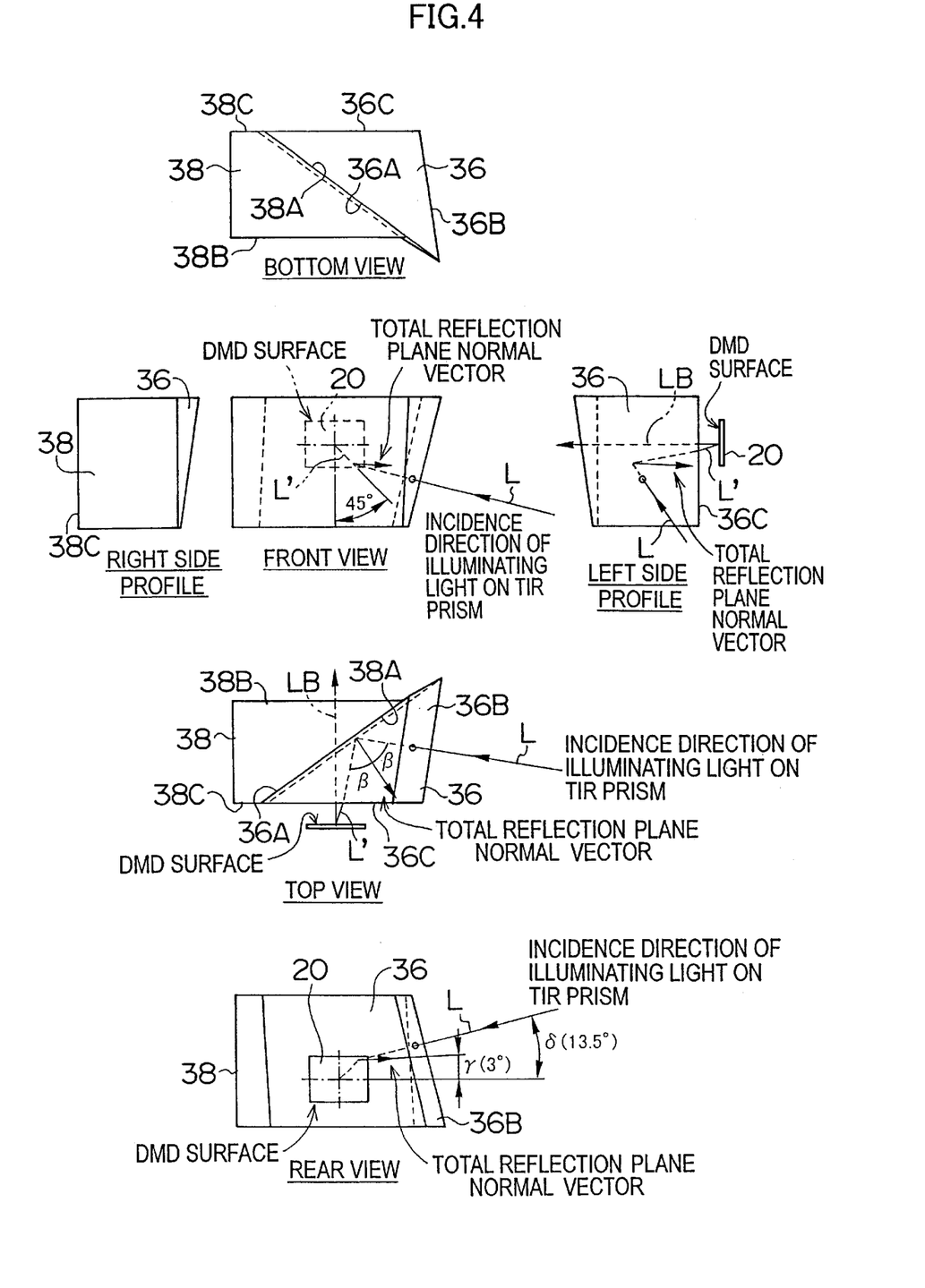
FIG. 4 is a development illustrating the configuration of the TIR prism.

FIG. 3 and FIG. 4 respectively show a perspective view and a development of the configuration of the TIR prism 18.

As illustrated in these drawings, the TIR prism 18 in this preferred embodiment of the invention comprises a first prism 36 and a second prism 38. The first prism 36 and the second prism 38 are so arranged that a plane 36A of the first prism 36 and a plane 38A of the second prism 38 be opposite each other via an air layer (air gap) between them. Further, a plane 36C of the first prism 36 and a plane 38C of the second prism 38 form the same plane together, and these plane 36C and plane 38C are arranged to be parallel to the surface of the DMD 20 and, at the same time a plane 38B of the second prism 38 is also arranged to be parallel to the surface of the DMD 20.

In this TIR prism 18, the illuminating light is brought to incidence on the first prism 36 to be vertical to its plane 36B and, after being totally reflected by the plane 36A, emitted from the plane 36C toward the DMD 20. Then, the projecting light reflected by the DMD 20 is totally transmitted by the plane 36A of the first prism 36 and the second prism 38 to be guided to the projecting optical system 22.

The plane 36A of this first prism 36 (hereinafter to be referred to as the "total reflection plane") is formed at an angle of inclination $\alpha$ ($\alpha$ is the angle formed by the surface of the DMD 20 and the total reflection plane 36A) permitting total reflection of the illuminating light brought to incidence vertically on the plane 36B (hereinafter to be referred to as the "incidence plane") and total transmission of the reflected light from the DMD 20, and in a predetermined direction so that a projection line representing the normal vector of the total reflection plane (hereinafter to be referred to as the "total reflection plane normal vector") as viewed in a direction vertical to the surface of the DMD 20 forms an angle γ smaller than 45° to the long side of the DMD 20 (in FIG. 4, the total reflection plane normal vector illustrated in the front view and the rear view corresponds to the projection line representing the total reflection plane normal vector as viewed in the direction vertical to the surface of the DMD 20).

On the other hand, the incidence plane 36B of the first prism 36 is so formed that the total reflection of the illuminating light coming vertically incident on that plane by the total reflection plane 36A and the emission of the totally reflected light from the plane 36C (hereinafter to be referred to as the "emission plane") toward the DMD 20 cause the surface of the DMD 20 to be irradiated at an incidence angle of 24° to the surface of the DMD 20 in a direction forming an angle of 45° to the long (or short) side of the DMD 20. Thus, in order for the optical axis L' of the illuminating light emitted from the emission plane 36C toward the DMD 20 to have an incidence angle of 24° to the surface of the DMD 20 and for the projection line representing the optical axis L' as viewed in the direction vertical to the surface of the DMD (in FIG. 4, the optical axis L' illustrated in the front view corresponds to the projection line representing the optical axis L' as viewed in the direction vertical to the surface of the DMD 20) to form an angle of 45° to the long (or short) side of the DMD 20, it is necessary to bring into incidence the illuminating light coming incident from the illuminating optical system 16 at a predetermined incidence angle β and in a direction forming a predetermined angle δ to the long side of the DMD 20, and the incidence plane 36B is formed as a plane orthogonal to the optical axis L of the incident light.

In the TIR prism 18 configured as described above, the illuminating optical system 16 need not bring the illuminating light into incidence on the TIR prism in a direction forming an angle of 45° to the long side of the DMD 20 as according to the prior art, and thereby enables the projector device to be reduced in thickness.

Thus in the TIR prism 18 in this embodiment of the invention, by so forming the total reflection plane 36A relative to the DMD 20 that the projection line representing the total reflection plane normal vector as viewed in the direction vertical to the surface of the DMD 20 be at an angle smaller than 45° to the long side of the DMD 20 (γ<45°), the illuminating light brought to incidence on the TIR prism 18 by the illuminating optical system 16 is enabled to come incident at an angle smaller than 45° to the long side of the DMD 20 as illustrated in FIG. 2 through FIG. 4, thereby enabling the projector device to be reduced in thickness.

Further by enabling the illuminating light to come incident on the TIR prism 18 at an angle smaller than 45° to the long side of the DMD 20, the number of reflecting mirrors for guiding the illuminating light to the TIR prism 18 can also be reduced, thereby enabling the projector device to be simplified (see FIG. 2 and FIG. 8).

Although this embodiment of the invention has been described with reference to an example in which the angle of inclination of the micromirrors constituting the DMD 20 is ±12°, the invention can as well be applied to a case in which the angle of inclination of the micromirrors is ±10°. In this case, the illuminating light is brought to incidence at an incidence angle of 20° to the surface of the DMD 20 in a direction forming an angle of 45° to the long or short side of the DMD 20.

EXAMPLE

Next will be described an example of TIR prism to be applied to a projector device pertaining to the present invention.

The example explained here is a TIR prism applicable to a projector device using a DMD whose micromirrors are inclined at ±12°.

As described above, in a DMD whose micromirrors are inclined at ±12°, it is necessary for the illuminating light to irradiate the surface of the DMD 20 at an incidence angle of 24° to the surface of the DMD 20 in a direction forming an angle of 45° to the long or short side of the DMD 20.

As illustrated in FIG. 3 and FIG. 4, the illuminating light is brought to incidence vertically on the incidence plane 36B of the first prism 36, totally reflected by the total reflection plane 36A, and guided to the DMD 20. Then, the projecting light reflected by the DMD 20 is totally transmitted by the total reflection plane 36A of the first prism 36 and the second prism 38 and guided to the projecting optical system 22.

The total reflection plane 36A of the first prism 36 is formed at an inclination angle of α=34.7° to the surface of the DMD 20. This inclination angle of α=34.7° is set as an inclination angle permitting total reflection of the illuminating light brought to incidence vertically on the incidence plane 36B and total transmission of the reflected light from the DMD 20.

The total reflection plane 36A of the first prism 36 is oriented in a predetermined direction so that the angle γ formed between the projection line representing the total reflection plane normal vector as viewed in the direction vertical to the surface of the DMD 20 and the long side of the DMD 20 be equal to 3°. This angle γ=3° is set at a degree smaller than 45°, and preferably should be close to 0° as long as the requirement of total reflection is met.

On the other hand, the incidence plane 36B of the first prism 36 is formed to be irradiated at an incidence angle of 24° to the surface of the DMD 20 in a direction forming an angle of 45° to the long side of the DMD 20 by the total reflection of the illuminating light brought to incidence vertically on the incidence plane 36B by the illuminating optical system 16, its total reflection by the aforementioned total reflection plane 36A and emission from the emission plane 36C toward the DMD 20.

Here, the total reflection plane 36A, as described above, is formed to have an inclination angle of α=34.7° to the surface of the DMD 20 and oriented in a predetermined direction so that the angle γ formed between the projection line representing the total reflection plane normal vector as viewed in the direction vertical to the surface of the DMD 20 and the long side of the DMD 20 be equal to 3°. In order for the illuminating light totally reflected by the total reflection plane 36A formed in such a way as to irradiate the surface of the DMD 20 at an incidence angle of 24° to the surface of the DMD 20 in a direction at an angle of 45° to the long side of the DMD 20, the illuminating light should be brought to incidence at an incidence angle of β=47.3° to the total reflection plane 36A and in a direction at an angle of δ=13.5° to the long side of the DMD 20. Therefore, the incidence plane 36A of the first prism 36 is formed as a plane orthogonal to the optical axis L of the illuminating light satisfying this requirement.

In the TIR prism 18 configured as described, since the illuminating light brought to incidence on the TIR prism 18 comes in a direction at an angle of δ=13.5° to the long side of the DMD 20, the illuminating optical system can be configured in a substantially horizontal state, and accordingly the projector device can be reduced in thickness.

As hitherto described, according to the present invention, the illuminating optical system need not bring the illuminating light into incidence on the TIR prism in a direction forming an angle of 45° to the long or short side of the DMD 20 as according to the prior art, and therefore the projector device can be reduced in thickness.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A projector device in which light from a light source is guided by an illuminating optical system to a total internal reflection prism, the light totally reflected by the total internal reflection prism is optically modulated by having the light reflected by a digital micromirror device, and the light transmitted by the total internal reflection prism after the optical modulation is projected by a projecting optical system on a screen, wherein:

the total internal reflection prism has a total reflection plane which totally reflects illuminating light to guide the illuminating light to the digital micromirror device and totally transmits the light having undergone optical modulation by the digital micromirror device, and is so arranged relative to the digital micromirror device that a projection line representing a normal vector of the total reflection plane as viewed in a direction vertical to a surface of the digital micromirror device forms an angle smaller than 45° to one of a long side and a short side of the digital micromirror device; and the illuminating optical system so brings the illuminating light into incidence on the total reflection plane that a projection line representing the optical axis of the illuminating light emitted from the total internal reflection prism to the digital micromirror device, as viewed in the direction vertical to the surface of the digital micromirror device, forms an angle of 45° to the one of the long side and the short side of the digital micromirror device.

2. The projector device as set forth in claim 1, wherein the total internal reflection prism is so arranged relative to the digital micromirror device that the projection line representing the normal vector of the total reflection plane as viewed in the direction vertical to the surface of the digital micromirror device forms an angle of substantially 0° to the one of the long side and the short side of the digital micromirror device.

* * * * *